June 9, 1964 S. A. W. JOLLIFFE ETAL 3,136,995

NAVIGATION AIDING RECEIVERS

Filed Oct. 24, 1960 3 Sheets-Sheet 1

INVENTORS
Sidney Arthur Walter Jolliffe
and
Francesco Saverio Immirzi
BY Baldwin & Wight
ATTORNEYS INVENTORS
Sidney Arthur Walter Jolliffe
and
Francesco Saverio Immirzi
BY Baldwin & Wight
ATTORNEYS INVENTORS
Sidney Arthur Walter Jolliffe
and
Francesco Saverio Immirzi
BY Baldwin & Wight
ATTORNEYS United States Patent Office 3,136,995

Patented June 9, 1964

3,136,995

NAVIGATION AIDING RECEIVERS

Sidney Arthur Walter Jolliffe, Maldon, and Francesco Saverio Immirzi, Great Baddow, England, assignors to The Marconi Company Limited, London, England, a British company Filed Oct. 24, 1960, Ser. No. 64,554
Claims priority, application Great Britain Dec. 18, 1959
7 Claims. (Cl. 343—105)

This invention relates to navigation aiding radio receivers and has for its object to provide improved and simplified receivers adapted to utilize the transmissions of multi-station navigation aiding transmitting systems of a type now in operation and generally known as the "Decca" type.

In a transmitting system of the type referred to there is a chain of geographically spaced transmitting stations in known predetermined positions, one station being termed the "master" and the others the "slaves," the latter being given distinguishing designations. Thus, the chain of stations now operating in this country consists of four stations, namely, a "master" station and three "slave" stations designated "red," "green" and "purple" respectively. To each station is given a different allocated carrier frequency (unmodulated) which are all different harmonics of a basic common denominator frequency F. Thus, in the British chain as now operating, F is 14.166 kc./s.; the allocated "master" frequency is 6F; the allocated "red" frequency is 8F; the allocated "green" frequency is 9F; and the allocated "purple" frequency is 5F. In addition to these frequencies, which will herein be referred to as the "allocated" frequencies, another frequency (also unmodulated) herein to be termed the "additional" frequency, is radiated by the system, the additional frequency differing from one of the allocated frequencies by an amount which is considerably less than the difference between any two of the other frequencies and is a sub-multiple of the basic common denominator frequency F. Thus, in the British chain, the additional frequency is 8.2F which differs from the "red" allocated frequency by 0.2F. All the frequencies transmitted are rigorously phase locked to one another so that if any two allocated frequencies, one from one station and another from another, are received at a receiver and transformed into waves of the same frequency, the phase relation between the two transformed waves will be a measure of the difference between the propagation times from the two stations to the receiver. Each station transmits all the frequencies—the allocated frequencies and the additional frequency—in accordance with a cyclically repeated sequence so chosen that, during the cycle, there are spaced intervals of time in which one of the stations transmits all the frequencies, other spaced intervals of time in which another of the stations transmits all the frequencies . . . and so on, each station transmitting its own allocated frequency most of the time but interrupting that transmission to send, during short periods of interruption, one or other of the other frequencies in succession, i.e. in successive interruptions.

Figure 1:
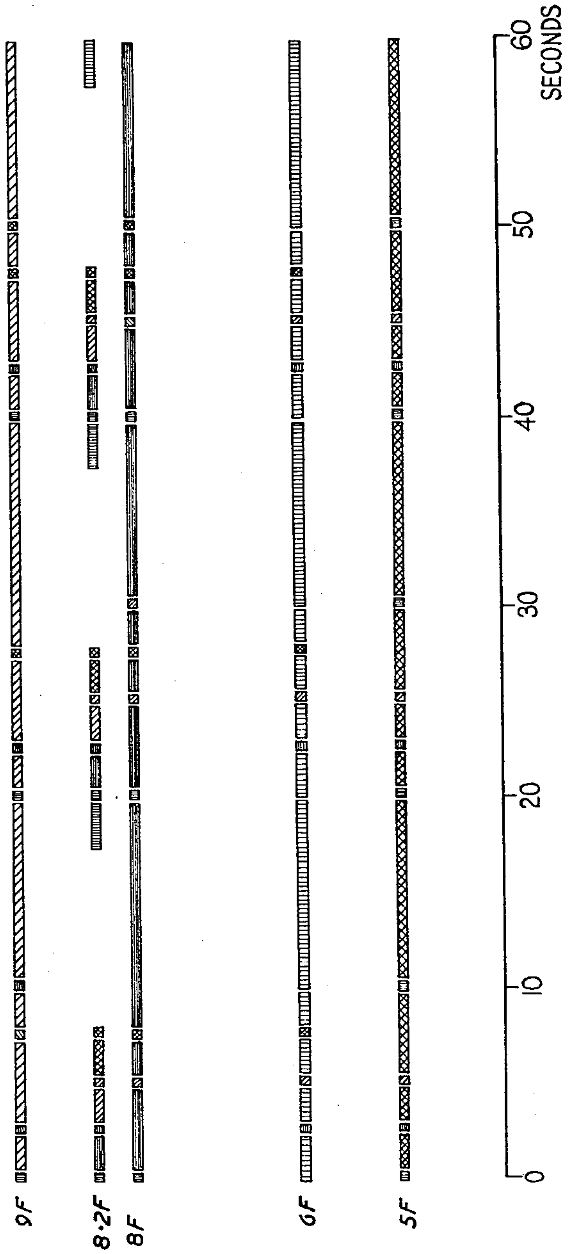

The general nature of the transmissions effected will be better understood from FIGURE 1 of the accompanying drawings. This figure shows diagrammatically the cycle of transmissions of the present British chain of stations. As will be seen, the cycle takes 60 seconds, the bottom line of the diagram being a time scale. The other horizontal lines of the diagram give the times at which and the stations from which the various frequencies as marked at the end of each line are transmitted. The times of transmission are given with reference to the time scale at the bottom of FIGURE 1 and the stations transmitting the different frequencies at different times are given by differently shading different parts of the diagram, the vertically shaded portions representing transmissions from the master station; the horizontally shaded portions representing transmissions from the red stations; the obliquely shaded portions representing transmissions from the green station; and the cross-hatched portions representing transmissions from the purple station. It will be seen that, at 20 second intervals commencing at the beginning of each cycle of 60 seconds, the master station transmits all the frequencies for half a second, i.e. at 0, 20 and 40 seconds; at 20 second intervals commencing 2½ seconds later, the red station transmits all the frequencies for half a second, i.e. at 2½, 22½ and 42½ seconds; at 20 second intervals commencing a further 2½ seconds later, the green station transmits all the frequencies for half a second, i.e. at 5, 25 and 45 seconds; and at 20 second intervals commencing a still further 2½ seconds later the purple station transmits all the frequencies for half a second, i.e. at 7½, 27½ and 47½ seconds.

In present known receivers for co-operating with a system as above described, the received allocated frequencies are changed to waves of the same frequency and the phase relation between pairs of waves thus derived is measured, each phase measurement defining a hyperbolic position line for the receiver. It is common to use, in conjunction with such receivers, previously prepared charts marked out in hyperbolic position lines colored in accordance with the color designations of the slave stations and marked in accordance with phase angles so that the phase measurements can be translated directly into already printed position lines on the chart. Since, however, the maximum phase relation which can be recognized by a phase meter is 360°, ambiguity arises by reason of the fact that path differences resulting in phase relations differing by 360° or a multiple thereof, will give the same meter reading, and, unless provision is made to resolve this type of ambiguity, a phase measurement will define not one particular hyperbolic position line but a number of position lines each similarly situated in a so-called "lane" which is 360° wide. One way of resolving this type of ambiguity, which is well known, is to use phase clocks instead of simple phase meters, the clocks actually counting up the total phase changes occurring as the receiver moves across the position lines. This expedient, however, has the defect that the receiver must start within the coverage area of the system at a known position therein, in order that, before the receiver starts to move, the phase clocks may be set to their correct initial readings. This obviously cannot be done (except with the assistance of some other navigation aid) if the receiver enters the coverage area from outside. Another defect is that the receiver and its phase clocks must be kept continuously in operation. Modern practice is, therefore, to provide means for what is called "lane identification." It is in order to enable lane identification to be effected at a receiver that the somewhat elaborate cycle of operations, exemplified by FIGURE 1, with transmission of the additional frequency, is provided in the system, for obviously, if lane identification is not required, all that it is necessary to do is to transmit the allocated frequencies continuously and uninterruptedly each from the station to which it is allocated. The means provided in known receivers for utilizing the transmitted frequencies to effect lane identification will not be described herein, since the invention is not concerned with known receivers, but it may be remarked that they involve considerable cost and complexity and while cost and complexity are never desirable, they are obviously far more undesirable in navigation aiding receivers than in navigation aiding transmitting systems and simplification of such receivers is of great practical advantage.

The present invention seeks to provide improved navigation aiding receivers adapted to utilize the transmissions from a navigation aiding transmitting system of the type referred to which shall be comparatively simple, able to give unambiguous position line information whenever the receiver is switched on within the coverage of the transmitting system and which will be of sufficient instrumental accuracy having regard to average practical considerations of propagation. With regard to this matter of "sufficient" accuracy, the practical accuracy of any radio navigation aid which is dependent upon effects brought about by path length differences between a receiver and geographically separated transmitting stations, is limited by considerations of constancy and identity of radio propagation conditions between the various stations and the receiver and it is pointless to seek to obtain, in such a receiver, an instrumental accuracy exceeding that set by the variations of propagation conditions to be expected in practice under ordinary working conditions. A receiver, therefore, which has an instrumental accuracy of the same order as the above limiting accuracy may be regarded as of "sufficient" accuracy and receivers in accordance with this invention are of sufficient average accuracy in this sense of the words.

According to this invention a navigation aiding radio receiver adapted to utilize the transmissions of a navigation aiding transmitting system of the type referred to comprises a plurality of receiver sections each fed with a different one of the allocated frequencies received from said system; a plurality of oscillators one in each section and all of the same nominal frequency equal to a submultiple of the basic common denominator frequency of said system; timed switch means; means controlled by said timed switch means for controlling the oscillator in each section to locked relationship with respect to the signals of allocated frequency fed to that section during times when said signals are present in said section and for controlling said oscillator to locked relationship with respect to signals of said sub-multiple frequency being derived from signals being received at said other times; and means separately responsive to the phase relation between oscillations from the oscillator in the section to which the frequency allocated to the master station of the system is fed and the oscillations from each of the oscillators in the sections to which the frequencies of the slave stations of the systems are fed, for giving hyperbolic position line indications.

Preferably the nominal frequency of the oscillators is equal to the difference between the additional frequency of the system and the allocated frequency of that slave station of the system which is nearest in frequency to said additional frequency and the signals of sub-multiple frequency with respect to which the oscillators are locked at certain times are derived by beating together received signals of said additional frequency with signals of said slave station allocated frequency.

Locking of each oscillator with respect to allocated frequency signals present in the section in which that oscillator is included, is preferably effected by bringing said signals and oscillations from said oscillator to waves of the same frequency, applying the two waves thus derived as inputs to a first phase discriminator, and applying the output from said first discriminator to control the said oscillator.

Locking of each oscillator with respect to signals of sub-multiple frequency is preferably effected by applying said signals and oscillations from said oscillator as inputs to a second phase discriminator and applying the output from said discriminator to control the said oscillator.

Preferably the timed switch means include two switches, one closed when the other is open and vice versa, in each section, one being included in a signal channel between a source of allocated frequency in said section and the first phase discriminator and the other being included in a signal channel between a source of signals of the aforesaid sub-multiple frequency and the second phase discriminator.

Preferably also the phase relation responsive means includes a common local oscillator; a plurality of gated circuits one appropriated to each of the oscillators in the sections fed with frequencies allocated to the slave stations of the system; means for applying oscillations from the common local oscillator to all said gated circuits; means responsive to pulses derived from the oscillations from the oscillator in the section fed with the frequency allocated to the master station of the system for opening all said gated circuits each time one of said pulses occurs; means responsive to pulses derived from the oscillations from the oscillators in the sections fed with the frequencies allocated to the slave stations of the system for reclosing each gated circuit each time one of said pulses from the oscillator in the section to which said gated circuit is appropriated occurs; and a plurality of counters, each fed with oscillations from the common local oscillator and passed by a different gated circuit when opened, for counting the oscillations passed thereby in a predetermined period of time.

The timed switch means may conventiently be a multiple contact switch driven in steps by a pulse driven stepping motor having a cycle of movement of predetermined period initiated by a synchronizing pulse derived from incoming received signals and driven, between synchronizing pulses, by a local pulse source of predetermined frequency.

Figure 2:
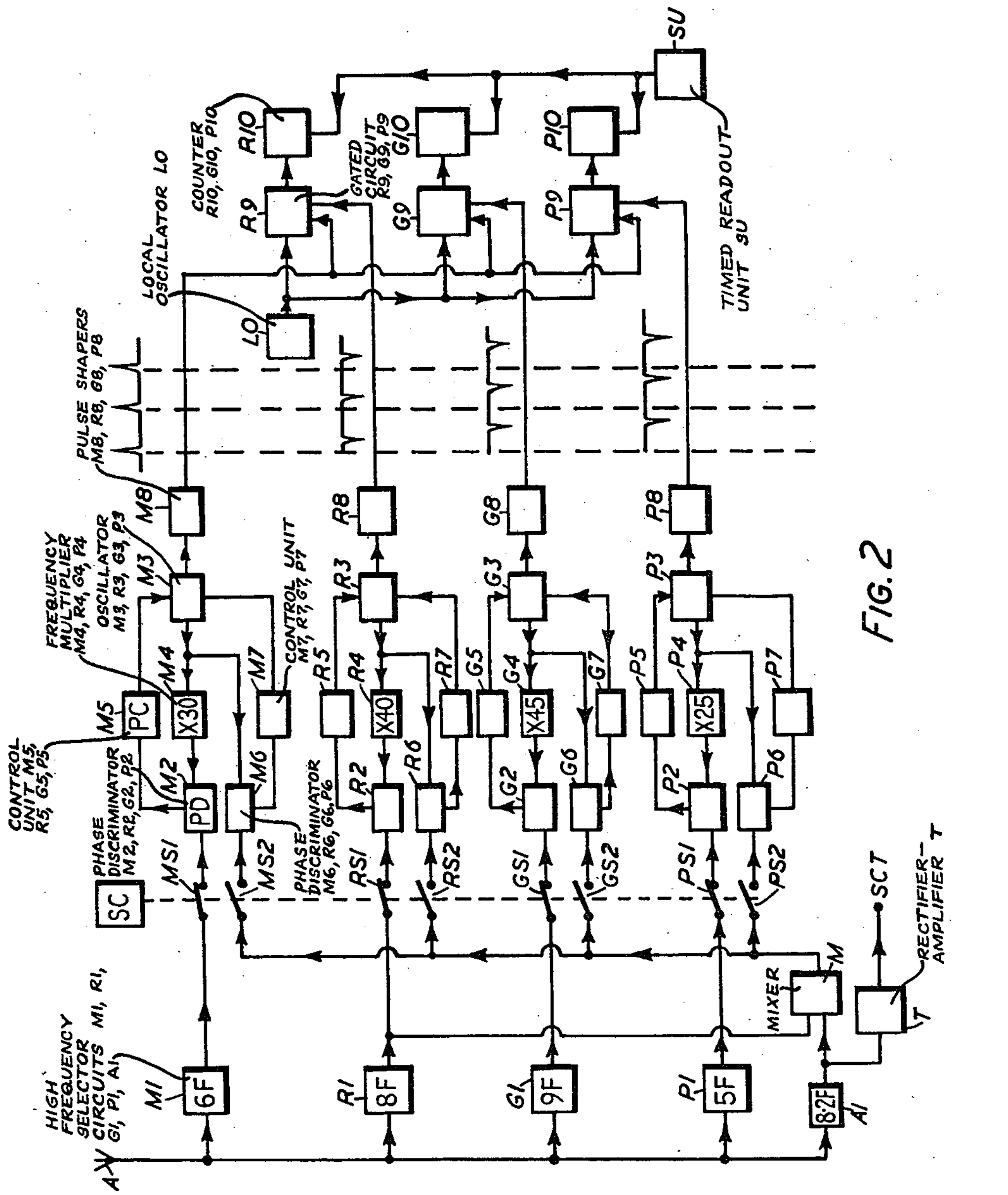
Figure 3:
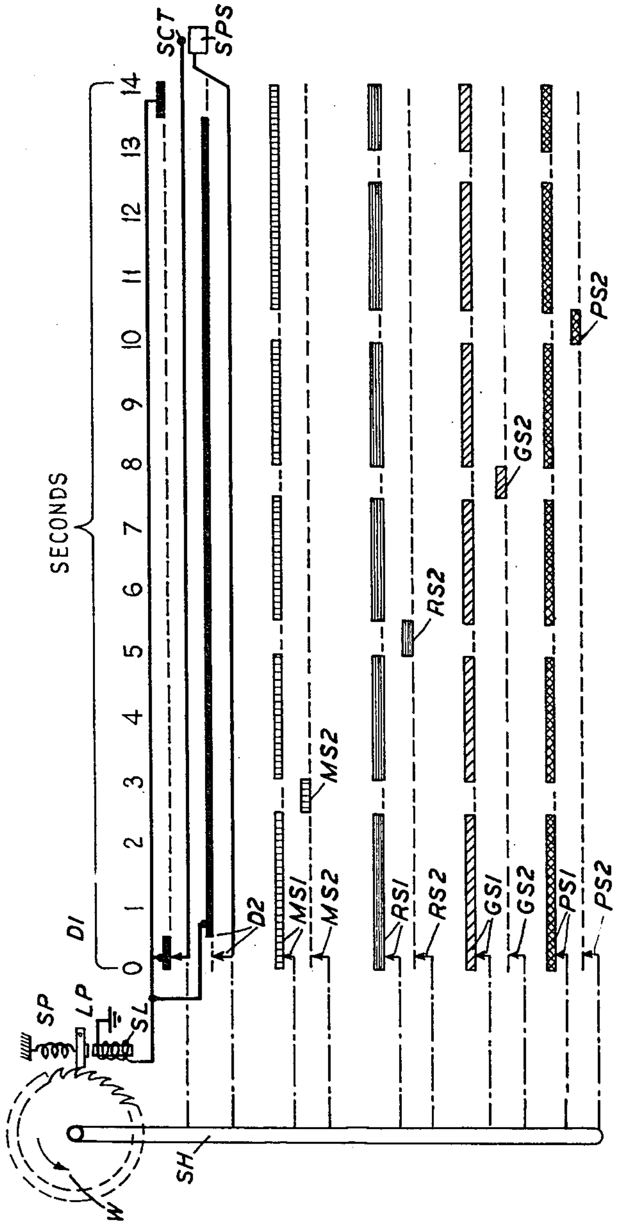

The invention is illustrated in FIGURES 2 and 3 of the accompanying drawings in which FIGURE 2 is a block diagram of a receiver adapted to utilize signals from a system operating as represented in FIGURE 1, and FIGURE 3 is a diagrammatic representation of the timing switch means employed in the apparatus of FIGURE 2.

Referring to FIGURE 2, A is a receiving aerial which feeds into a receiver including four sections, one appropriated to the master station of the system, and the others appropriated to the slave stations, namely, the red, green and purple stations.

The aerial A feeds in parallel into five high frequency selector circuits referenced M1, R1, G1, P1 and A1. The circuit M1 separates the frequency of 6F allocated to the master stations; the circuits R1, G1 and P1 separate respectively the frequencies 8F, 9F and 5F allocated to the red, green and purple stations respectively; and the circuit A1 separates the additional frequency 8.2F of the system.

Dealing first with what may be termed the master section, output from the circuit M1 is fed through a switch MS1 (when closed) as one input to a phase discriminator M2, the other input to which is derived through a frequency multiplier M4 having a multiplication factor of 30, from an oscillator M3 of nominal frequency of 0.2F, i.e. equal to the difference between the additional frequency of 8.2F and the red allocated frequency of 8F. The error signal output from the discriminator M2 is fed to a control unit M5, e.g. of the reactance valve type, which controls the oscillator M3 so that the oscillations thereof are maintained in locked relationship with respect to the signals from unit M1. The switch MS1 is one of a number of switches forming parts of a timed switch means so arranged, as will be described later herein, to ensure the result that the switch MS1 is closed during times when the master allocated frequency is present in the receiver. During other times the timed switch means opens the switch MS1 and closes the switch MS2.

Output from the additional frequency selecting circuit A1 is fed as one input to a mixer M whose other input is taken from the output of the red allocated frequency selector circuit R1. The mixer M is arranged to give an output of the difference frequency 0.2F. This frequency is fed through the switch MS2 (when closed) as one input to a second phase discriminator M6 whose other input is taken direct from the oscillator M3. The error signal output from the discriminator M6 is employed through a control unit M7 corresponding to the unit M5 to control the oscillator M3 so that when the switch MS2 is closed the oscillator M3 is in locked relationship with respect to the beat frequency from the mixer M. In this way the result is assured that as soon as the receiver comes into the coverage area of the transmitting system and is switched on, the oscillator M3 is correctly locked with respect to the master oscillations from the transmitting system, for although it would be possible for the phase discriminator M2 to lock the oscillator M3 with respect to the frequency 6F in any of the numerous conditions in which the 30-fold multiplied frequency from the oscillator M3 is in phase with the frequency 6F, the control effected by the discriminator M6 removes ambiguity from this cause and ensures correct locking.

It is unnecessary to describe in detail the parts of the red, green and purple sections of the receiver corresponding to the parts of the master section as so far described because, as will be apparent from FIGURE 2, the sections are generally similar. Corresponding parts of the different sections are indicated by references which are similar except for the initial letter, the initial letter M being used for the master section, R for the red section, G for the green section, and P for the purple section. The sections as so far described differ only in that different factors of multiplication are used in the multipliers M4, R4, G4 and P4, the multiplication factors provided by these units being respectively 30, 40, 45 and 25.

The outputs from the oscillators M3, R3, G3 and P3 are fed to pulse shapers M8, R8, G8 and P8 respectively. These shapers may be of any known kind adapted to translate each oscillation from the appropriate oscillator into a sharp pulse as indicated conventionally above the output leads from the said pulse shapers. It will be noted that there are different time intervals between the occurrences of the pulses from the pulse shapers R8, G8 and P8 on the other hand. These time intervals depend upon the position of the receiver with respect to the master and slave stations of the system and correspond to the propagation times between the said stations and the receiver.

A common local oscillator LO, which is a stable local oscillator operating at, for example 1 mc./s., supplies output oscillations in parallel to three gated circuits R9, G9 and P9 appropriated respectively to the red, green and purple sections. Output from the shaper M8 is applied as one control input to all these gated circuits and is arranged in known manner to open all these circuits each time a pulse from the unit M8 occurs. A second control input for the gated circuit R9 is constituted by the output from the pulse shaper R8 and this is arranged in known manner to close the gated circuit R9 (previously opened by a pulse from M8) when a pulse from R8 occurs.

The gated circuit G9 is similarly opened by each pulse from M8 and closed by the next subsequent pulse from G8 and the gated circuit P9 is opened by each pulse from M8 and closed by the next subsequent pulse from P8.

Thus the outputs from the gated circuits R9, G9 and P9 will consist of bursts of oscillations of the frequency of the oscillator LO, the bursts being in each case of length dependent upon the intervals between the pulses in the output from M8 on the one hand and the pulses from the appropriate one of the shaper R8, G8 and P8 on the other hand. The gated outputs from the circuits R9, G9 and P9 are fed to counters R10, G10 and P10 which are arranged automatically to present their count at desired intervals of time, e.g. at one second intervals, by any convenient known timed readout unit SU. Such timed readout of counter contents can be accomplished for example by gating means as shown in Figure VII–16, page 175 of "Digital Computing Systems" published 1959 by McGraw-Hill Book Co., Inc. The counters R10, G10 and P10 are preferably arranged to give indications in a form enabling direct co-relation of indications with the hyperbolic position lines on a previously prepared chart such as is ordinarily used at the present time in connection with known navigation aiding receivers adapted to co-operate with systems of the type referred to.

The control of the switches MS1, MS2, RS1, RS2, GS1, GS2 and PS1, PS2 is only conventionally indicated in FIGURE 2 by a block marked SC and a chain line extending from that block to the switches. One form of the timing switch means only conventionally indicated in FIGURE 2 will now be described with reference to FIGURE 3 which is a developed diagram of the switch means.

The timing switch means illustrated by FIGURE 3 is a switch of the multiple leaf type having contactors represented by arrows which, in conjunction with contacts spaced as shown, constitute the switches MS1, MS2, RS1, RS2, GS1, GS2 and PS1 and PS2 as indicated by the references in FIGURE 3. In addition there are two further contactors which, with the contacts over which they sweep, constitute two further switches D1 and D2 (which do not appear in FIGURE 2) as indicated. All the contactors are driven together as indicated by the chain lines in FIGURE 3 by a shaft SH driven by a step-by-step motor of the pawl and ratched wheel type. This motor comprises an operating solenoid SL adapted to attract a driving pawl LP against the pull of a spring SP so that the result of feeding a pulse to the unit SL is to attract the pawl which, on cessation of the pulse, returns under its spring and drives the wheel W through one tooth. The step-by-step motor of FIGURE 3 is arranged to drive its wheel W through one complete revolution in a time of 14 seconds and in 28 steps at half second intervals. A time scale is shown across the top of FIGURE 3.

Assuming the timing switch means to be in the position shown in the figure, the switch D1 is closed and the switch D2 is open. Pulses from a switching pulse source SPS providing 120 pulses per minute are applied to the elongated contact represented by the thick black line of the switch D2, but they are unable to reach the solenoid SL because, for the moment, the switch D2 is open. The first step of the step-by-step motor is obtained by applying to the terminal SCT (which also appears in FIGURE 2) an amplified, rectified pulse obtained by rectifying output from the selector circuit A1 in a rectifier-amplifier T (see FIGURE 2). This causes the solenoid SL to drive the wheel W through its first step opening the switch D1 and closing the switch D2. It will be noted that this method of initiating the commencement of each switching cycle ensures synchronization of the switching means with the 8.2F transmission of the transmitting system. Obviously, this first step will occur as soon, after switching on, as the 8.2F transmission is received whether that first reception of the 8.2F transmission is from the master station or from one of the slave stations. However, incorrect synchronization from this cause will cure itself for, as will be seen, upon further reference to FIGURE 1, the selection of 14 seconds for one complete rotation of the wheel W ensures that the timing switch means will automatically bring itself into correct synchronization in, at the most, two revolutions of the wheel W.

The first step of the wheel W opens the switch D1 and closes the switch D2 and thereafter, until the last half second of the 14-second period, the solenoid SL is energized through the switch D2 by pulses from the source SPS and the wheel W steps along one step each half second. For the final half second of the 14 seconds the switch D2 opens and drive for the solenoid SL is obtained again from terminal SCT through the last contact of switch D1, which contact is shown by the thick black line spanning the last half second of the 14-second period and is connected to the contact spanning the first half second. The source SPS should be of reasonably stable frequency. It may be synchronized with incoming received signals in any convenient manner, though normally this will not be necessary since synchronization of the timing means is obtained every 14 seconds.

The times of opening and closing of the switches MS1, MS2, RS1, RS2, GS1, GS2 and PS1, PS2 will, it is thought, be obvious from FIGURE 3 without further detailed description. For better facility of understanding of FIGURE 3, the contacts of the switches MS1, MS2 are shown with the shading employed in FIGURE 1 to designate the master station, and the contacts of the remaining switches are shown with the shadings used in FIGURE 1 to designate red, green and purple stations respectively.

We claim:

1. A navigation aiding radio receiver adapted to utilize the transmission of a navigation aiding transmitting system, said receiver comprising a plurality of receiver sections each fed with a different one of the allocated frequencies received from said system; a plurality of oscillators, one in each section and all of the same nominal frequency equal to a sub-multiple of the basic common denominator frequency of said system; timed switch means; means controlled by said timed switch means for controlling the oscillator in each section to locked relationship with respect to the signals of allocated frequency fed to that section during times when said signals are present in said section and for controlling said oscillator to locked relationship with respect to signals of said sub-multiple frequency at other times, said signals of sub-multiple frequency being derived from signals being received at said other times; and means separately responsive to the phase relation between oscillations from the oscillator in the section to which the frequency allocated to the master station of the system is fed and the oscillations from each of the oscillators in the sections to which the frequencies of the slave stations of the system are fed, for giving hyperbolic position line indications.

2. A navigation aiding radio receiver as claimed in claim 1 wherein the nominal frequency of the oscillators is equal to the difference between an additional frequency of the system and the allocated frequency of that slave station of the system which is nearest in frequency to said additional frequency and the signals of sub-multiple frequency with respect to which the oscillators are locked at certain times are derived by beating together received signals of said additional frequency with signals of said slave station allocated frequency.

3. A navigation aiding radio receiver as claimed in claim 1 wherein locking of each oscillator with respect to allocated frequency signals present in the section in which that oscillator is included is effected by bringing said signals and oscillations from said oscillator to waves of the same frequency, applying the two waves thus derived as inputs to a first phase discriminator, and applying the output from said first discriminator to control the said oscillator.

4. A navigation aiding radio receiver as claimed in claim 1 wherein locking of each oscillator with respect to signals of sub-multiple frequency is effected by applying said signals and oscillations from said oscillator as inputs to a second phase discriminator and applying the output from said discriminator to control the said oscillator.

5. A navigation aiding radio receiver as claimed in claim 1 wherein the timed switch means include two switches, one closed when the other is open and vice versa, in each section, one being included in a signal channel between a source of allocated frequency in said section and the first phase discriminator and the other being included in a signal channel between a source of signals of the aforesaid sub-multiple frequency and the second phase discriminator.

6. A navigation aiding radio receiver as claimed in claim 1 wherein the phase relation responsive means includes a common local oscillator, a plurality of gated circuits one appropriated to each of the oscillators in the sections fed with frequencies allocated to the slave stations of the system; means for applying oscillations from the common local oscillator to all said gated circuits; means responsive to pulses derived from the oscillations from the oscillator in the section fed with the frequency allocated to the master station of the system for opening all said gated circuits each time one of said pulses occurs; means responsive to pulses derived from the oscillations from the oscillators in the sections fed with the frequencies allocated to the slave stations of the system for reclosing each gated circuit each time one of said pulses from the oscillator in the section to which said gated circuit is appropriated occurs; and a plurality of counters, each fed with oscillators from the common local oscillator and passed by a different gated circuit when opened, for counting the oscillations passed thereby in a predetermined period of time.

7. A navigation aiding radio receiver as claimed in claim 1 wherein the timed switch means is in the form of a multiple contact switch driven in steps by a pulse driven stepping motor having a cycle of movement of predetermined period initiated by a synchronizing pulse derived from incoming received signals and driven, between synchronizing pulses, by a local pulse source of predetermined frequency.

References Cited in the file of this patent

UNITED STATES PATENTS 2,844,816 O'Brien et al. ------------ July 22, 1958